United States Patent
Wei et al.

(10) Patent No.: US 11,467,357 B2
(45) Date of Patent: Oct. 11, 2022

(54) EMITTER MODULE

(71) Applicant: Lumentum Operations LLC, San Jose, CA (US)

(72) Inventors: Cailin Wei, San Jose, CA (US); Jihua Du, San Jose, CA (US); Prasad Yalamanchili, San Jose, CA (US)

(73) Assignee: Lumentum Operations LLC, San Jose, CA (US)

(*) Notice: Subject to any disclaimer, the term of this patent is extended or adjusted under 35 U.S.C. 154(b) by 0 days.

(21) Appl. No.: 17/249,099

(22) Filed: Feb. 19, 2021

(65) Prior Publication Data
US 2022/0196932 A1 Jun. 23, 2022

Related U.S. Application Data

(60) Provisional application No. 63/199,377, filed on Dec. 22, 2020.

(51) Int. Cl.
*G02B 6/02* (2006.01)
*G02B 6/26* (2006.01)
(Continued)

(52) U.S. Cl.
CPC ....... *G02B 6/4203* (2013.01); *G02B 6/02042* (2013.01); *G02B 6/02052* (2013.01); *G02B 6/262* (2013.01); *G02B 6/4249* (2013.01); *G02B 6/43* (2013.01); *G02B 6/425* (2013.01); *G02B 2006/12147* (2013.01)

(58) Field of Classification Search
CPC .......... G02B 6/02042; G02B 6/02052; G02B 6/262; G02B 6/4203; G02B 6/4249; G02B 6/425; G02B 6/43; G02B 2006/12147
See application file for complete search history.

(56) References Cited

U.S. PATENT DOCUMENTS 4,490,020 A * 12/1984 Sakaguchi ............... G02B 6/32
385/33
4,763,975 A * 8/1988 Scifres ................ G02B 6/4249
385/115
(Continued)

FOREIGN PATENT DOCUMENTS

CN 108873171 A * 11/2018 ............... G02B 6/02
JP 09269426 A * 10/1997

OTHER PUBLICATIONS

Yoshinar Awaji, "Review of Space-Division Multiplexing Technologies in Optical Communications," IEICE Trans. Commun., vol. E102-B, No.1, Jan. 2019, 16 Pages.
(Continued)

*Primary Examiner* — Ryan A Lepisto
(74) *Attorney, Agent, or Firm* — Harrity & Harrity, LLP

(57) ABSTRACT

In some implementations, an emitter module may include an emitter array that includes multiple emitters, and an optical fiber that includes multiple cores within a single cladding. The emitter array may be optically coupled to a tip of the optical fiber such that each emitter, of the multiple emitters of the emitter array, is optically coupled to a respective core of the multiple cores of the optical fiber. The optical fiber may include an integral lens at the tip of the optical fiber. The integral lens at the tip of the optical fiber may be in alignment with the multiple cores of the optical fiber.

20 Claims, 3 Drawing Sheets

(51) Int. Cl.
  *G02B 6/42*   (2006.01)
  *G02B 6/43*   (2006.01)
  *G02B 6/12*   (2006.01)

(56) References Cited

U.S. PATENT DOCUMENTS

| | | | | |
|---|---|---|---|---|
| 5,455,879 A * | 10/1995 | Modavis | ............ | G02B 6/4203 |
| | | | | 385/15 |
| 5,734,766 A * | 3/1998 | Flint | ............ | G02B 6/4203 |
| | | | | 385/48 |
| 5,845,024 A * | 12/1998 | Tsushima | ............ | G02B 6/4206 |
| | | | | 385/33 |
| 6,094,515 A * | 7/2000 | Miki | ............ | G02B 6/4203 |
| | | | | 385/31 |
| 6,137,938 A * | 10/2000 | Korn | ............ | G02B 6/241 |
| | | | | 385/123 |
| 6,160,943 A * | 12/2000 | Davis | ............ | G02B 6/02042 |
| | | | | 385/126 |
| 6,238,102 B1 * | 5/2001 | Ohtani | ............ | G02B 6/30 |
| | | | | 385/66 |
| 6,301,406 B1 * | 10/2001 | Irie | ............ | G02B 6/4203 |
| | | | | 385/33 |
| 6,317,550 B2 | 11/2001 | Irie et al. | | |
| 6,332,053 B1 * | 12/2001 | Irie | ............ | G02B 6/2552 |
| | | | | 385/123 |
| 6,529,535 B2 * | 3/2003 | Katayama | ............ | G02B 6/4203 |
| | | | | 372/29.02 |
| 6,597,825 B1 | 7/2003 | Yuan et al. | | |
| 6,597,835 B2 * | 7/2003 | Jie | ............ | B24B 19/226 |
| | | | | 385/33 |
| 6,856,726 B2 * | 2/2005 | Fuhrmann | ............ | G01J 3/02 |
| | | | | 385/13 |
| 7,068,882 B2 * | 6/2006 | Saito | ............ | G02B 6/2552 |
| | | | | 385/33 |
| 8,588,267 B1 * | 11/2013 | Panak | ............ | G02B 6/425 |
| | | | | 372/69 |
| 9,090,666 B2 * | 7/2015 | Wang | ............ | G02B 6/262 |
| 9,837,782 B2 * | 12/2017 | Sakamoto | ............ | H01S 5/405 |
| 9,847,840 B2 | 12/2017 | Xu et al. | | |
| 2004/0033024 A1 | 2/2004 | Remillard et al. | | |

OTHER PUBLICATIONS

Tetsuya Hayashi et al., "Multi-Core Optical Fibers for the Next-Generation Communications," SEI Technical Review, No. 86, Apr. 2018, pp. 23-28.

Tetsuya Hayashi et al., "Multi-Core Fibers for Data Center Applications," ECOC, 2019, 4 Pages.

* cited by examiner

EMITTER MODULE

CROSS-REFERENCE TO RELATED APPLICATION

This Patent Application claims priority to U.S. Provisional Patent Application No. 63/199,377, filed on Dec. 22, 2020, and entitled "LASER DIODE MODULE WITH MULTIPLE CORE FIBER." The disclosure of the prior Application is considered part of and is incorporated by reference into this Patent Application.

TECHNICAL FIELD

The present disclosure relates generally to emitter modules and to emitter modules that employ multi-core fiber.

BACKGROUND

Laser diodes are semiconductor devices that may be pumped with electrical current to create lasing conditions that may be used to convert electrical energy into light. In an emitter module, a laser diode may be optically coupled to an optical fiber. This may be useful to safely transport the light, enable amplification, improve beam quality by converting an elliptical beam shape into light that has a circular and smooth intensity profile, or the like. Coupling an optical output from a laser diode into an optical fiber typically involves aligning the laser diode and a proximal end of the optical fiber (e.g., using micro-positioning stages) while monitoring a power output at a distal end of the optical fiber to obtain a maximum power transfer (or coupling efficiency) between the laser diode and the optical fiber. After the laser diode and the optical fiber are suitably aligned or otherwise positioned to maximize an output power from the optical fiber, the proximal end is typically secured using glass solder, metal solder, adhesive, a permanent laser-welded fiber attachment, or the like.

SUMMARY

In some implementations, a laser module includes a housing; a laser array that includes multiple lasers integrated on a common substrate, the laser array being disposed in the housing; and an optical fiber that includes multiple cores within a single cladding, at least a tip of the optical fiber being disposed in the housing, where the laser array is optically coupled to the tip of the optical fiber such that each laser, of the multiple lasers of the laser array, is optically coupled to a respective core of the multiple cores of the optical fiber, where the optical fiber includes an integral lens at the tip of the optical fiber, and where the integral lens at the tip of the optical fiber is in alignment with the multiple cores of the optical fiber.

In some implementations, an emitter module includes an emitter array that includes multiple emitters; and an optical fiber that includes multiple cores within a single cladding, where the emitter array is optically coupled to a tip of the optical fiber such that each emitter, of the multiple emitters of the emitter array, is optically coupled to a respective core of the multiple cores of the optical fiber, where the optical fiber includes a lens at the tip of the optical fiber, and where the lens at the tip of the optical fiber is in alignment with the multiple cores of the optical fiber.

In some implementations, an optical fiber includes a cladding; multiple cores within the cladding, where the multiple cores are coplanar; and an integral lens at a tip of the optical fiber, where the integral lens at the tip of the optical fiber is in alignment with the multiple cores of the optical fiber.

DETAILED DESCRIPTION

The following detailed description of example implementations refers to the accompanying drawings. The same reference numbers in different drawings may identify the same or similar elements.

Optical communication systems (e.g., for data communication) may use optical fiber for light transmission. Typically, such systems may employ single core fiber, which has limited capacity. In some cases, an optical communication system may be configured for parallel transmission of multiple channels. This may be implemented using arrays of single core fibers. For example, a first single core fiber may be used for transmission of a first channel, a second single core fiber may be used for transmission of a second channel, and so forth. In some examples, each single core fiber may carry multiple channels using wavelength division multiplexing, and an optical cable can include multiple single core fibers. However, the transmission capacity of optical communication systems based on single core fibers is limited. Accordingly, an optical communication system may use multi-core fiber (e.g., optical fiber that includes multiple cores in a single cladding) to increase capacity.

Relatedly, some optical amplifiers may employ multi-core fiber. However, in some cases, a multi-core fiber optical amplifier may utilize a laser pumping architecture that is based on single core fiber. For example, the multi-core fiber amplifier may be pumped using fan-in and fan-out couplers, such that individual cores of the multi-core fiber are separately pumped using single-core fiber pump lasers. Accordingly, the optical communication systems and optical amplifiers described above may be bulky, overly complex, and/or difficult to troubleshoot, due to the use of numerous single core fibers.

Some implementations described herein provide an emitter module that uses multi-core fiber. In some implementations, an emitter module may include an emitter array (e.g., implemented in a multi-emitter chip) and a multi-core fiber. The emitter array may be optically coupled to a tip of the multi-core fiber such that each emitter of the emitter array is optically coupled to a respective core of the multi-core fiber. In some implementations, the multi-core fiber may include multiple cores within a single cladding of the multi-core fiber. Moreover, the tip of the multi-core fiber may include a lens that is in alignment with the multiple cores.

In this way, the emitter module described herein facilitates simplified architectures for optical transmission and compact form factor. The emitter module may be implemented as an optical amplifier pump laser, as a source laser for an optical communication system, or the like. Accordingly, the emitter module may facilitate simplification and miniaturization of the optical amplifier or the optical communication system.

Figure 1:
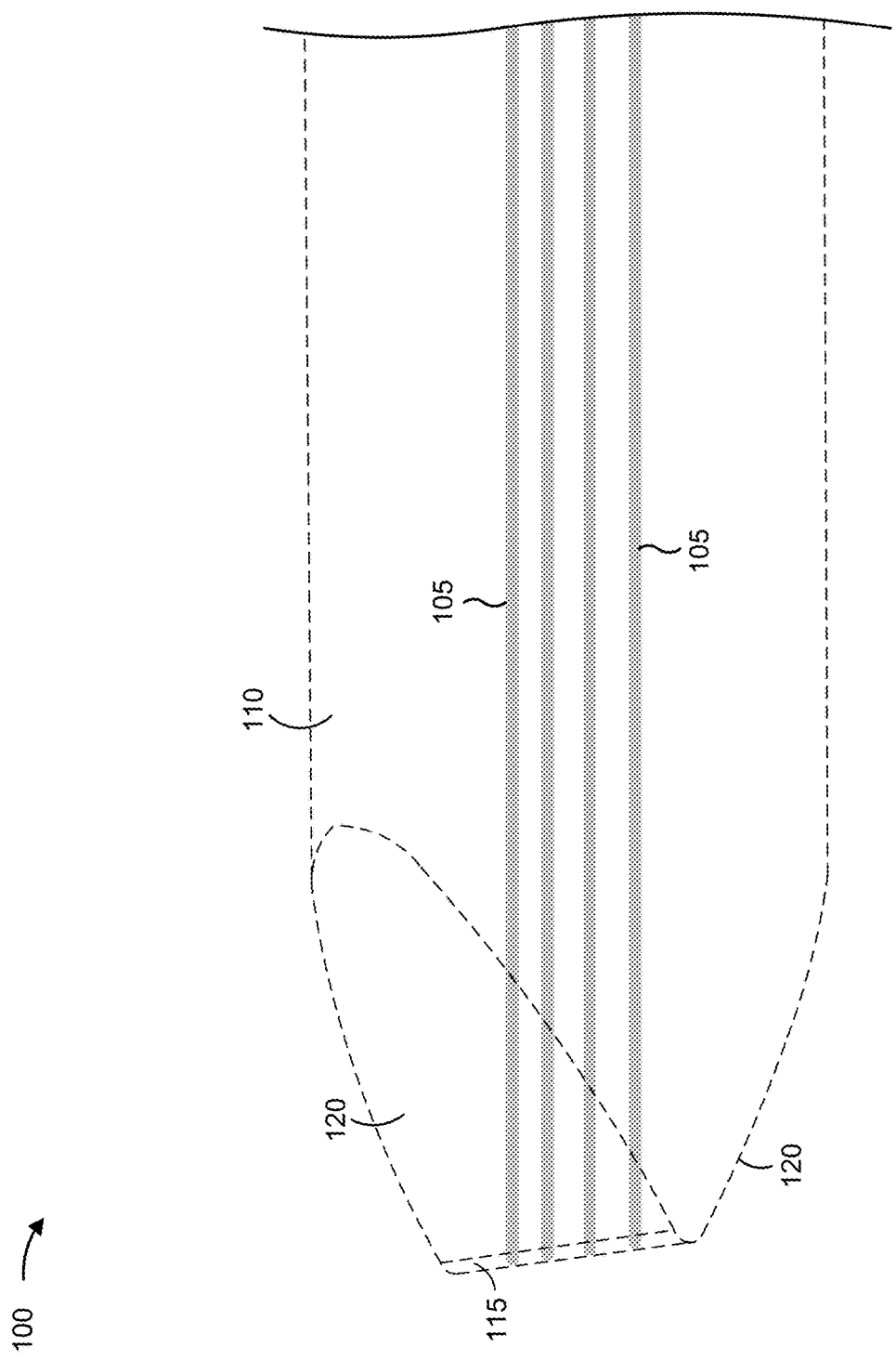
FIG. 1 is a diagram of an example optical fiber described herein.

FIG. 1 is a diagram of an example optical fiber 100. As shown in FIG. 1, optical fiber 100 may include multiple cores 105. A core 105 may be composed of glass or another material that transmits light. A core 105 may have a diameter of about 5-10 microns, such as about 8 microns or about 9 microns. In some implementations, the multiple cores 105 may include at least two cores 105, at least three cores 105, at least four cores 105, or five or more cores 105. The multiple cores 105 may be coplanar. That is, the multiple cores 105 may be disposed in the optical fiber 100 in a linear arrangement.

The optical fiber 100 may include a cladding 110 that surrounds the multiple cores 105. In other words, the multiple cores 105 may be disposed within a single cladding 110 (e.g., the multiple cores 105 are not within separate claddings). The cladding 110 may be composed of glass, plastic, or another similar material. The material of the cladding 110 may have a lower refractive index relative to the material of the cores 105. The cladding 110 may have a diameter of about 125 microns (e.g., for four-core optical fiber). In some implementations, the cladding 110 may have a diameter greater than 125 microns, such as about 180 microns (e.g., for eight-core optical fiber).

In some implementations, the optical fiber 100 may include one or more layers in addition to the cores 105 and the cladding 110. For example, the optical fiber 100 may include one or more coating (or buffer) layers (e.g., protective layers) that surround the cladding 110, one or more reinforcement layers (e.g., yarn, Kevlar, or fiber layers) that surround the one or more coating layers, and/or an outer jacket that surrounds one or more of the aforementioned layers.

The optical fiber 100 may include a lens 115 at a tip of the optical fiber 100. The lens 115 may be integral with (e.g., formed on) the optical fiber 100 (e.g., the lens 115 is an integral lens). That is, the optical fiber 100 may include a lensed tip (e.g., the optical fiber 100 is a lensed multi-core fiber). The lens 115 may be in alignment with the multiple cores 105 of the optical fiber 100. For example, each core 105 may be axially aligned with the lens 115. That is, a respective axis of each core 105 may intersect with the lens 115 (e.g., the lens 115 is a shared lens among the cores 105).

In some implementations, the lens 115 may include a wedge lens (sometimes referred to as a "chisel lens"). For example, the tip of the optical fiber 100 may include a pair of converging beveled surfaces 120 (e.g., formed in the cladding 110). The lens 115 may include a curved surface between the beveled surfaces 120. Thus, the curved surface may be in alignment with the multiple cores 105 of the optical fiber 100. In some implementations, the lens 115 may include another type of lens, such as a conical lens. In some implementations, the optical fiber 100 may include separate lenses for each core 105.

As indicated above, FIG. 1 is provided as an example. Other examples may differ from what is described with regard to FIG. 1.

Figure 2:
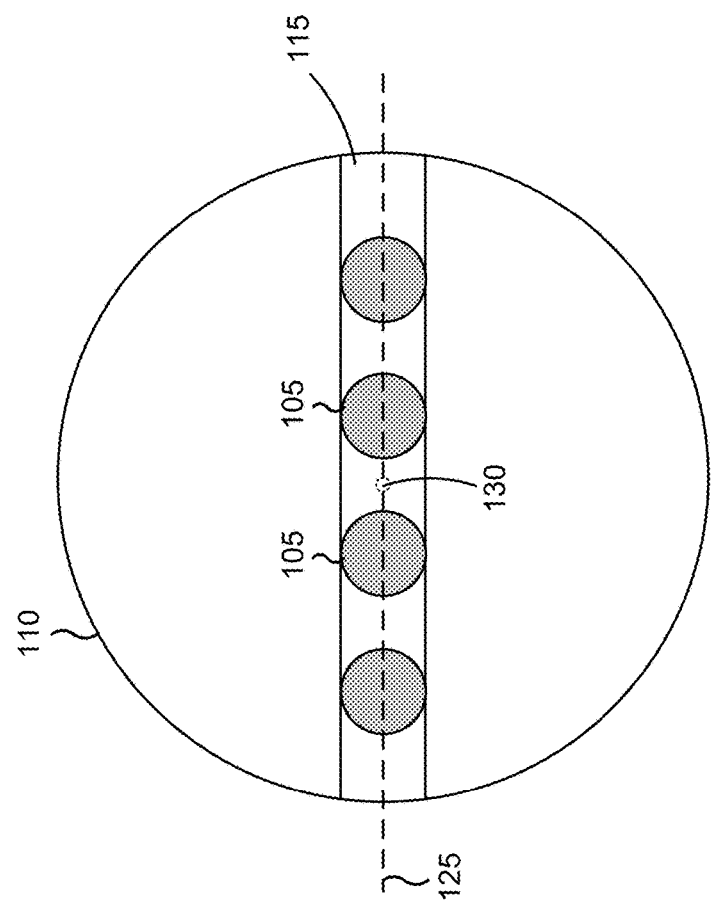
FIG. 2 is a diagram of a front view of the optical fiber of FIG. 1.

FIG. 2 is a diagram of a front view (e.g., a head-on view) of the optical fiber 100. In some implementations, the lens 115 may be formed by polishing the tip (e.g., the end face) of the optical fiber 100. The optical fiber 100 may be polished by beveling opposing sides of the optical fiber 100, such that the curved surface produced by polishing the optical fiber 100 is centered on the multiple cores 105, as shown. That is, the beveling converges at a line 125 defined by the centers of the multiple cores 105, and the curved surface is centered on the line 125 defined by the multiple cores 105. Thus, the curved surface of the lens 115 may include ends of the multiple cores 105 as well as a portion of the surrounding cladding 110. In other words, each core 105 may include a lens (e.g., a curved surface) that forms a portion of the lens 115. Moreover, the lenses on each core 105 may be formed in the same processing step (e.g., the polishing step, described above). In some cases, to produce the lens 115 centered on the multiple cores 105, rotational angle control (e.g., used for the polishing) about a central axis 130 of the optical fiber 100 may satisfy a threshold precision. For example, the rotational angle control may be less than or equal to 0.25 degrees (e.g., corresponding to a 2% coupling loss due to misalignment).

In some implementations, the line 125 defined by the multiple cores 105 extends along a center line of the optical fiber 100 that is orthogonal to the central axis 130. In other words, the multiple cores 105 are linearly arranged along the center of the optical fiber 100. Accordingly, the curved surface of the lens 115 may also extend along the center line of the optical fiber 100.

As indicated above, FIG. 2 is provided as an example. Other examples may differ from what is described with regard to FIG. 2.

Figure 3:
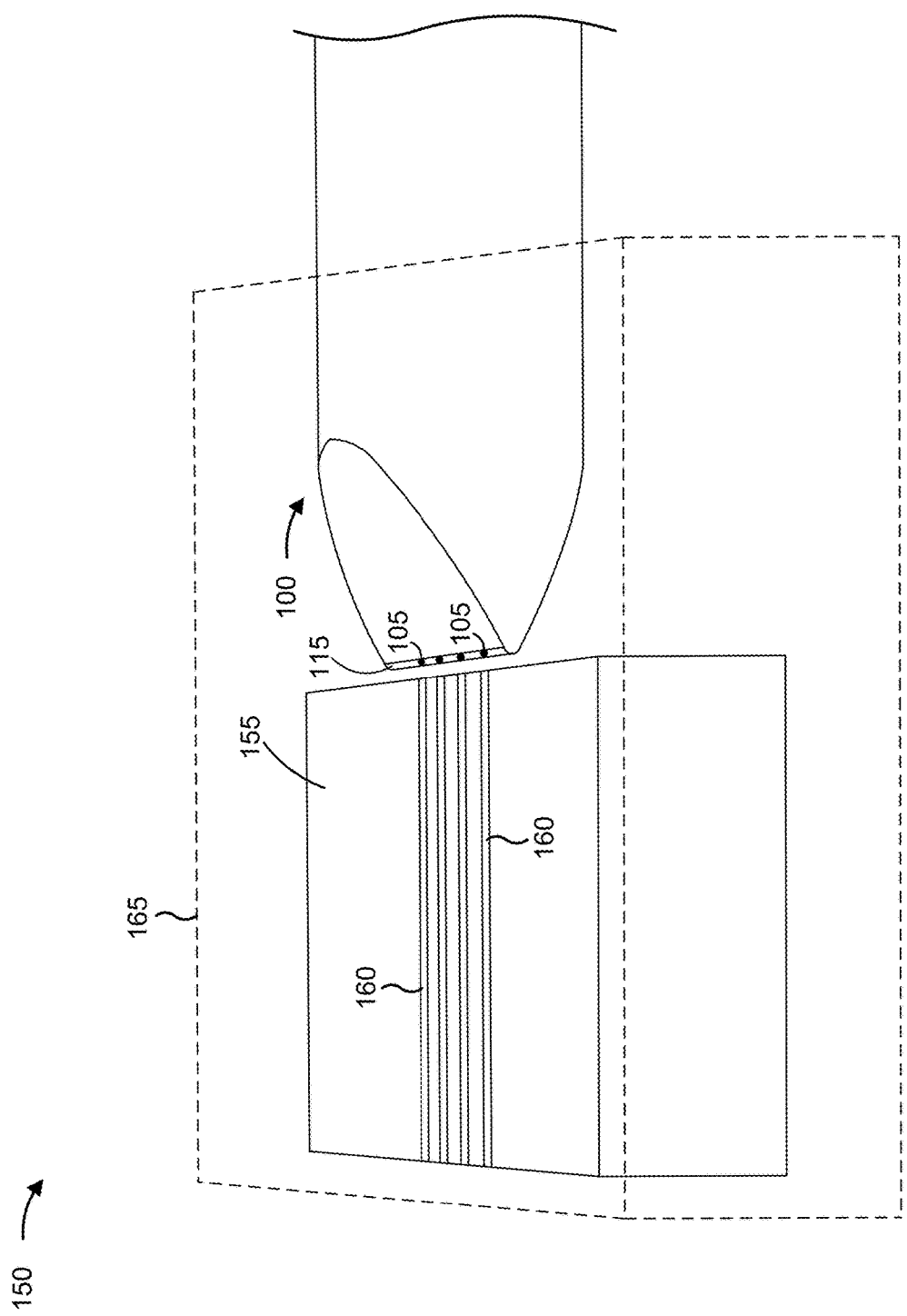
FIG. 3 is a diagram of an example emitter module described herein.

FIG. 3 is a diagram of an example emitter module 150. As shown, the emitter module 150 may include the optical fiber 100 and an emitter chip 155. The emitter chip 155 may include an emitter array (e.g., a semiconductor device) that includes multiple emitters 160 integrated on a common substrate (e.g., the multiple emitters 160 are coplanar). In some implementations, the emitter chip 155 is a laser chip that implements a laser array that includes multiple lasers (e.g., multiple laser diodes) integrated on a common substrate. The emitter array may include at least two emitters 160, at least three emitters 160, or at least four emitters 160. In some implementations, an emitter 160 may include an edge-emitting laser. For example, the emitter array may include multiple emitter stripes. In some implementations, the emitter chip 155 may include additional electrical circuitry and/or electrical connection elements for electrical connection of the emitter chip 155 to a circuit board, to a driver component, and/or to a power source, among other examples. In some implementations, the emitter chip 155 may include additional optical devices and/or optical circuitry, such as passive waveguides, gratings, passive devices, modulators, and/or photodetectors, among other examples.

In some implementations, the multiple emitters 160 may be configured to output light at respective wavelength ranges. For example, a first emitter 160 may be configured to output light in a first wavelength range, a second emitter 160 may be configured to output light in a second wavelength range, a third emitter 160 may be configured to output light in a third wavelength range, and so forth. In other words, the emitter array may be configured for multi-channel light transmission. In some implementations, the multiple emitters may operate in a 910-980 nanometer wavelength range, in a 1300-1399 nanometer wavelength range, in a 1400-1499 nanometer wavelength range, in a 1500-1599 nanometer wavelength range, and/or in a 1600-1699 (e.g., 1600-1625) nanometer wavelength range.

As shown in FIG. 3, the emitter module 150 may include a housing 165. The emitter chip 155 that includes the emitter array may be disposed in the housing 165. In addition, at least a portion of the optical fiber 100 may be disposed in the housing 165. For example, at least the tip of the optical fiber 100 that includes the lens 115 may be disposed in the housing 165. In some implementations, the housing 165 may enclose additional electrical components, such as a circuit board, a driver component, and/or a power source, among other examples, for operating the emitter array. In some implementations, the housing 165 may enclose additional optical components, such as one or more photodetectors, gratings, and/or other optical chips, among other examples.

The emitter array of the emitter chip 155 may be optically coupled to the tip of the optical fiber 100 that includes the lens 115. For example, each emitter 160 of the emitter array may be optically coupled to a respective core 105 of the optical fiber 100 (e.g., via a respective lens portion, of the lens 115, that is associated with the core 105). That is, the emitters 160 of the emitter array may be in alignment with (e.g., coplanar with) the multiple cores 105 of the optical fiber 100. As an example, a first emitter 160 may be optically coupled to (e.g., aligned with) a first core 105, a second emitter 160 may be optically coupled to (e.g., aligned with) a second core 105, a third emitter 160 may be optically coupled to (e.g., aligned with) a third core 105, and so forth.

The portion of the optical fiber 100 disposed in the housing 165 may be affixed to the housing 165 (e.g., by solder) in alignment with the emitter array of the emitter chip 155, as described above. The optical fiber 100 may be aligned with the emitter array according to a precision that provides a threshold coupling efficiency (e.g., greater than 70%, 80%, 90%, 95%, or 98%). For example, in a horizontal direction relative to the line 125 defined by the multiple cores 105, the optical fiber 100 and the emitter array may have an alignment offset of one micron or less. As another example, in a vertical direction relative to the line 125, the optical fiber 100 and the emitter array may have an alignment offset of 0.6 microns (corresponding to a one degree rotation of the optical fiber 100) or less, 0.3 microns or less, or 0.1 microns or less.

In some implementations, the emitter module 150 may be implemented in an optical system. In some implementations, the emitter module 150 may be implemented as an optical amplifier that uses multi-core fiber (e.g., for a multi-core fiber communication system). In particular, the emitter module 150 may be implemented as a pump laser (e.g., a multi-core fiber pump laser) of the optical amplifier. In this way, individual cores of the multi-core fiber of the optical amplifier may be pumped together using the multi-core fiber of the emitter module 150. In some implementations, other components of the optical amplifier may utilize multi-core fiber. For example, passive components of the optical amplifier may be configured to operate using multi-core fiber. As another example, the optical amplifier may utilize erbium-doped multi-core fiber for amplification.

In some implementations, the emitter module 150 may be implemented as a source laser (e.g., a multi-core fiber laser) for an optical communication system (e.g., for data communication). In particular, the multi-core fiber of the emitter module 150 may interface with an optical interface of an optical module (e.g., an optical transceiver) of the optical communication system, thereby reducing the quantity of fiber connections and complexity of the optical communication system. In this way, parallel transmission of multiple channels used for the optical communication system may be accomplished through the multi-core fiber.

As indicated above, FIG. 3 is provided as an example. Other examples may differ from what is described with regard to FIG. 3.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A laser module, comprising:
   a housing;
   a laser array that includes multiple lasers integrated on a common substrate, the laser array being disposed in the housing; and
   an optical fiber that includes multiple cores surrounded by and in direct contact with a single, integral cladding, at least a tip of the optical fiber being disposed in the housing, wherein the laser array is optically coupled to the tip of the optical fiber such that each laser, of the multiple lasers of the laser array, is optically coupled to a respective core of the multiple cores of the optical fiber, wherein the optical fiber includes an integral lens at the tip of the optical fiber, and wherein the integral lens is centered on a line defined by centers of the multiple cores.

2. The laser module of claim 1, wherein the integral lens comprises a wedge lens.

3. The laser module of claim 1, wherein the multiple lasers of the laser array are configured to output at respective wavelength ranges.

4. The laser module of claim 1, wherein the multiple lasers of the laser array comprise edge-emitting lasers.

5. The laser module of claim 1, wherein the multiple lasers of the laser array include at least four lasers.

6. The laser module of claim 1, wherein the laser module is implemented as an optical amplifier pump laser.

7. The laser module of claim 1, wherein the laser module is implemented as a source laser.

8. An emitter module, comprising:
an emitter array that includes multiple emitters; and
an optical fiber that includes multiple cores surrounded by and in direct contact with a single, integral cladding,
wherein the emitter array is optically coupled to a tip of the optical fiber such that each emitter, of the multiple emitters of the emitter array, is optically coupled to a respective core of the multiple cores of the optical fiber,
wherein the optical fiber includes a lens at the tip of the optical fiber, and
wherein the lens is centered on a line defined by centers of the multiple cores.

9. The emitter module of claim 8, wherein the lens comprises a wedge lens.

10. The emitter module of claim 8, wherein the multiple emitters of the emitter array are configured to output at respective wavelength ranges.

11. The emitter module of claim 8, wherein the multiple emitters of the emitter array are integrated on a common substrate.

12. The emitter module of claim 8, wherein the emitter array is implemented in a multi-emitter chip.

13. The emitter module of claim 8, further comprising:
a housing,
wherein the emitter array is disposed in the housing, and
wherein at least the tip of the optical fiber is disposed in the housing.

14. The emitter module of claim 8, wherein the multiple emitters of the emitter array include at least four emitters.

15. The emitter module of claim 8, wherein the lens is integral with the optical fiber.

16. An optical fiber, comprising:
a single, integral cladding;
multiple cores surrounded by and in direct contact with the single, integral cladding,
wherein the multiple cores are coplanar; and
an integral lens at a tip of the optical fiber,
wherein the integral lens is centered on a line defined by centers of the multiple cores.

17. The optical fiber of claim 16, wherein the integral lens comprises a wedge lens.

18. The optical fiber of claim 16, wherein the tip of the optical fiber comprises:
a pair of converging beveled surfaces; and
a curved surface between the pair of converging beveled surfaces.

19. The optical fiber of claim 18, wherein the curved surface is centered on the line defined by the centers of the multiple cores.

20. The optical fiber of claim 16, wherein the multiple cores include at least four cores.

* * * * *